United States Patent
Niemeijer

(10) Patent No.: US 11,870,839 B2
(45) Date of Patent: Jan. 9, 2024

(54) SYSTEMS AND METHODS FOR CACHE-BASED CONTENT DELIVERY

(71) Applicant: FreeWheel Media, Inc., Philadelphia, PA (US)

(72) Inventor: Gerrit Niemeijer, Maplewood, NJ (US)

(73) Assignee: FREEWHEEL MEDIA, INC., Philadelphia, PA (US)

( * ) Notice: Subject to any disclaimer, the term of this patent is extended or adjusted under 35 U.S.C. 154(b) by 0 days.

(21) Appl. No.: 14/494,533

(22) Filed: Sep. 23, 2014

(65) Prior Publication Data

US 2015/0089014 A1 Mar. 26, 2015

Related U.S. Application Data

(60) Provisional application No. 61/881,048, filed on Sep. 23, 2013.

(51) Int. Cl.
| | |
|---|---|
| *G06F 15/16* | (2006.01) |
| *H04L 67/06* | (2022.01) |
| *H04L 67/568* | (2022.01) |
| *H04L 67/5683* | (2022.01) |
| *G06Q 30/0251* | (2023.01) |

(52) U.S. Cl.
CPC ............ *H04L 67/06* (2013.01); *H04L 67/568* (2022.05); *H04L 67/5683* (2022.05); *G06Q 30/0251* (2013.01)

(58) Field of Classification Search
CPC .............................. H04L 67/06; H04L 67/2842
USPC ......................................................... 709/213
See application file for complete search history.

(56) References Cited

U.S. PATENT DOCUMENTS

| | | | |
|---|---|---|---|
| 6,785,707 B2 | 8/2004 | Teeple | |
| 7,769,805 B1 * | 8/2010 | Barnes | ............... G06F 16/9574 |
| | | | 709/219 |
| 8,516,529 B2 | 8/2013 | Lajoie et al. | |

(Continued)

FOREIGN PATENT DOCUMENTS

| | | |
|---|---|---|
| JP | 2009-538485 | 11/2009 |
| JP | 2012-203629 A | 10/2012 |

(Continued)

OTHER PUBLICATIONS

International Search Report and Written Opinion of the International Searching Authority, dated Feb. 10, 2015, from counterpart international application PCT/US2014/057069, International Filing Date Sep. 23, 2014.

(Continued)

*Primary Examiner* — Suraj M Joshi
*Assistant Examiner* — Joel Mesa
(74) *Attorney, Agent, or Firm* — BakerHostetler

(57) ABSTRACT

Methods, systems, and computer-readable media for cache-based management of non-linear content delivery are generally described. In some embodiments, content to be presented using consumer devices may be cached at a cache device of the consumer device. A cache policy server may transmit cache messages instruction the consumer devices which content to cache, which cache device to store the content, where to locate the content, and how much of the content to cache. When it is time to play the content at the consumer device, the content may be played back from the cache.

17 Claims, 4 Drawing Sheets

(56) References Cited

U.S. PATENT DOCUMENTS

| | | |
|---|---|---|
| 2004/0193807 A1* | 9/2004 | Mogi ................... G06F 16/20 |
| | | 711/137 |
| 2007/0260674 A1 | 11/2007 | Shenfield |
| 2008/0040666 A1 | 2/2008 | Wang et al. |
| 2010/0122037 A1 | 5/2010 | Porat et al. |
| 2010/0205049 A1* | 8/2010 | Long ................ G06Q 30/0252 |
| | | 705/14.5 |
| 2011/0231478 A1* | 9/2011 | Wheeler ............. G06F 16/951 |
| | | 709/224 |
| 2013/0031197 A1 | 1/2013 | Delos Reyes et al. |
| 2013/0110636 A1* | 5/2013 | Bott .................. G06Q 30/0277 |
| | | 705/14.64 |
| 2013/0219005 A1 | 8/2013 | Kotecha et al. |
| 2013/0227283 A1 | 8/2013 | Williamson et al. |
| 2013/0227284 A1 | 8/2013 | Pfeffer et al. |
| 2014/0040947 A1 | 2/2014 | Seth et al. |

FOREIGN PATENT DOCUMENTS

| | | |
|---|---|---|
| JP | 2015-531208 A | 10/2015 |
| WO | 2012/029564 A1 | 3/2012 |

OTHER PUBLICATIONS

Communication and European Search Opinion dated Mar. 3, 2017 forwarding Supplementary European Search Report issued in EP 14845757; 8 pages.

\* cited by examiner

SYSTEMS AND METHODS FOR CACHE-BASED CONTENT DELIVERY

CROSS REFERENCE TO RELATED APPLICATIONS

This application claims the benefit of U.S. Provisional Application No. 61/881,048 filed on Sep. 23, 2013, the contents of which are incorporated by reference in their entirety as if fully set forth herein.

FIELD OF INVENTION

The described technology generally relates to the non-linear delivery of content to consumer devices and, more specifically, to technology configured to facilitate the caching of portions of the content at the consumer devices to improve the efficiency and decrease the resource requirements of the delivery of the content to the consumer devices.

BACKGROUND

Consumers are becoming less reliant on linear programming channels for accessing content, such as television programs, movies, and music. Use of non-linear technologies such as video-on-demand (VOD), digital video recorders (DVR), and streaming are becoming standard modes for retrieving content as consumers increasingly expect instant, on-demand access. In addition, such non-linear technologies are being offered through cloud platforms that allow consumers to access content anytime and on multiple devices, such as televisions and mobile computing devices.

However, the amount of bandwidth for providing non-linear programming is often insufficient to meet consumer demand. In addition, processing and memory capabilities of consumer devices varies widely, such that the quality of the content is often inconsistent and access is frequently interrupted and/or requires long download times. It is generally difficult to integrate software and/or hardware into consumer devices that may attempt to address these issues, particularly in view of the wide range of devices and operating systems used to access content on a daily basis. Accordingly, non-linear content providers would benefit from technology that allowed consumers to efficiently and consistently access non-linear content through a wide array of available consumer devices.

SUMMARY

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a cache-based content delivery system may include a processor and a non-transitory, computer-readable storage medium in operable communication with the processor. The computer-readable storage medium may contain one or more programming instructions that, when executed, cause the processor to receive content targeting information for targeting content to a plurality of consumer devices, each of the plurality of consumer devices being operably coupled to at least one cache element, generate at least one cache instruction for each of the plurality of consumer devices based on the content targeting information, the at least one cache instruction comprising at least one content identifier and at least one cache duration, and transmit the at least one cache instruction to each of the plurality of consumer devices to instruct each of the plurality of consumer devices to cache a portion of the content associated with the at least one content identifier in the at least one cache element, the portion being specified by the at least one cache portion.

In an embodiment, a consumer device configured to cache content may include a processor and a non-transitory, computer-readable storage medium in operable communication with the processor. The computer-readable storage medium may contain one or more programming instructions that, when executed, cause the processor to receive at least one cache instruction comprising at least one content identifier and at least one cache portion, transmit a content request for a portion of content specified by the at least one content identifier and the at least one cache portion, receive the portion of content, and store the portion of content in the cache.

In an embodiment, a computer-readable storage medium having computer-readable program code configured to manage a cache-based content delivery system may include computer-readable program code configured to receive content targeting information for targeting content to a plurality of consumer devices, each of the plurality of consumer devices being operably coupled to at least one cache element, computer-readable program code configured to generate at least one cache instruction for each of the plurality of consumer devices based on the content targeting information, the at least one cache instruction comprising at least one content identifier and at least one cache duration, and computer-readable program code configured to transmit the at least one cache instruction to each of the plurality of consumer devices to instruct each of the plurality of consumer devices to cache a portion of the content associated with the at least one content identifier in the at least one cache element, the portion being specified by the at least one cache portion.

BRIEF DESCRIPTION OF THE DRAWINGS

The above and other objects of the present invention will become more readily apparent from the following detailed description taken in connection with the accompanying drawings.

DETAILED DESCRIPTION

Figure 1:
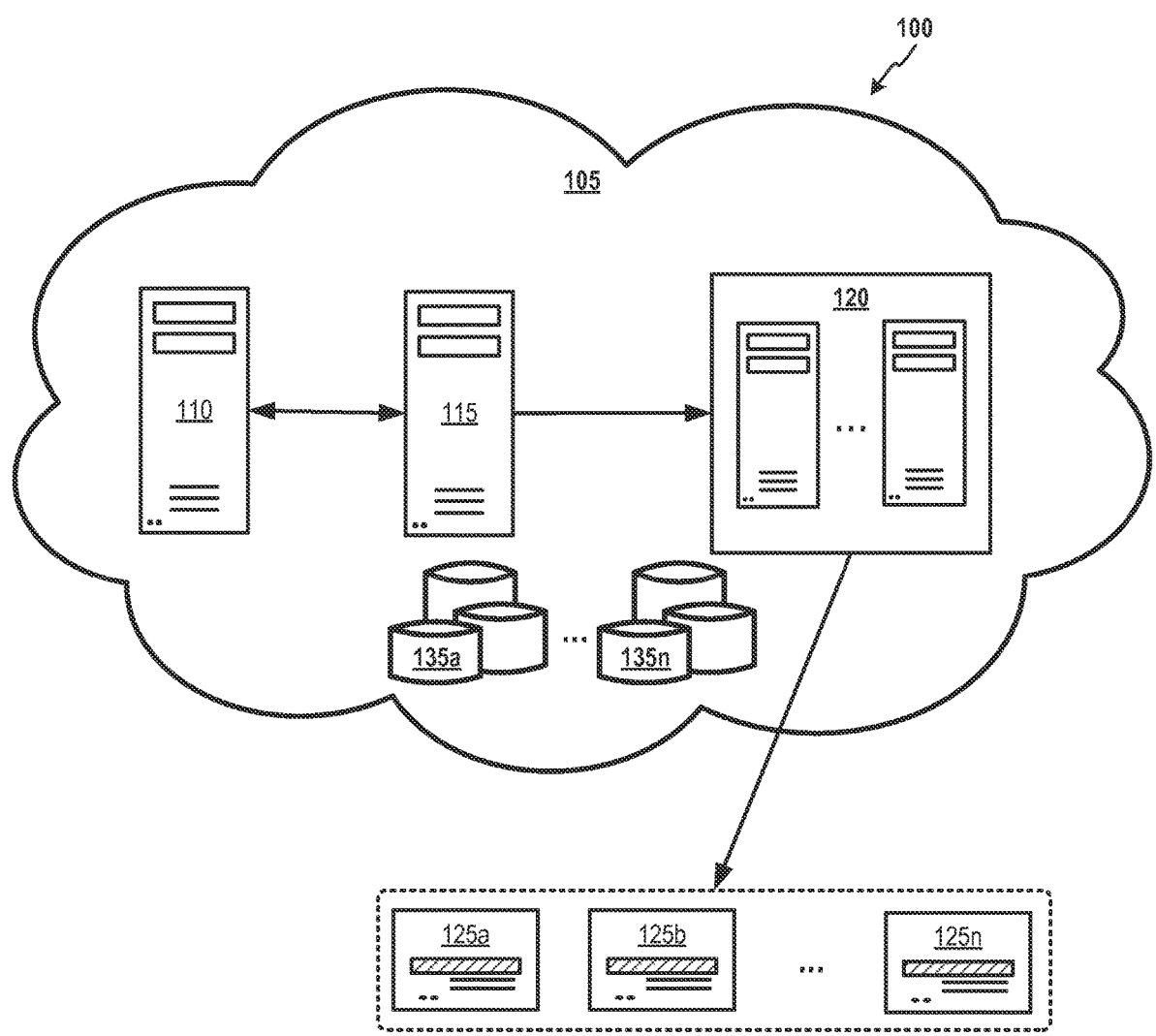
FIG. 1 depicts an illustrative content delivery management system according to some embodiments.

The described technology generally relates to systems and methods for the cache-based management of non-linear content delivery. Content (or a "content asset") may generally include any type of data, information, media, or the like that may be expressed through a medium. Illustrative mediums may include audio and visual mediums such as television, radio, and broadcast, cable, satellite, and/or network (e.g., Internet or "streaming") forms thereof. Examples of content may include, but are not limited to, video, audio, movies, video games, television and radio programs, commercials, websites, images, photographs, text, electronic or digital documents, haptic or tactile sensations, information feeds, streaming media, and/or combinations thereof. In some embodiments, the content may be or may include addressable content, including, without limitation, addressable advertisements.

In some embodiments, a content delivery management system (the "system") may be configured to provide content to consumers through consumer premises equipment (CPE) operably coupled to a cache device. The CPE may store (or "cache") at least a portion of the content in the cache device. In some embodiments, the cached content may include content designated to be presented to a consumer at a future time. For instance, the cached content may include an advertisement designated to be presented to a viewer during a particular program, day-part (e.g., morning, afternoon, evening, night, lunch time, prime time, etc.), and/or the like, that is cached before the designated program, day-part, and/or the like. In some embodiments, only a portion of a content asset may be cached in the cache device. In some embodiments, portions of a plurality of different content assets may be cached in the cache device. The portions may include a particular duration of a cache asset, such as the first 2 seconds of an advertisement content asset. In some embodiments, the system may be configured to transmit cache messages to the CPEs instructing the CPEs to cache certain portions of particular content assets. In this manner, when a cached content asset is consumed via a CPE, at least a portion of the content asset may be available through local storage.

Although examples using advertisement content assets, and addressable advertisements in particular, are used herein, embodiments are not so limited as any type of content capable of operating according to some embodiments is contemplated herein.

The content management system described according to some embodiments provides multiple technological advantages and technical effects on processes and techniques, including processes and techniques external to the content management system. One non-limiting technological advantage is that the content management system may allow certain devices, such as consumer premises equipment, and/or networks, such as non-linear content delivery networks, to operate more effectively and efficiently. Accordingly, the content management system according to some embodiments may operate to improve content delivery and consumption processes by making the process more efficient, accurate, and cost-effective and may improve the user experience of consumers interacting with content and content providers.

FIG. 1 depicts an illustrative content delivery management system according to some embodiments. As shown in FIG. 1, a system 100 may include and/or be in communication with a network 105, such as the Internet or a cloud-computing system (the "cloud"). A content delivery system or network (CDN) 120 may be configured to transmit content (or content assets) to consumer devices (or customer premises equipment (CPE)) 125a-n. The network 105 and/or the CDN 120 may be configured to transmit content through unicast, multicast, QAM, QPSK, MPEG transport streams (e.g., MPEG-2), IP (e.g., IP multicast or unicast over an IP network), or any other method now known by those having ordinary skill in the art or developed in the future.

The network 105 and/or the CDN 120 may be managed by a service provider to provide content to users and/or subscribers. Non-limiting examples of service providers includes a television broadcast network, a cable television network, a satellite television network, an internet service provider (ISP), a computing device advertising network, a media distribution network, a cloud computing network, a local area network (LAN), a wide area network (WAN), a terrestrial network, a mobile network, a VOD service, a DVR service, and/or any combination thereof.

In general, a CPE 125a-n includes any device or equipment configured to allow a consumer to access and communicate with the network 105 and/or CDN 120 and associated equipment. In some embodiments, the CPE 125a-n may be or may include a content presentation device. In general, a content presentation device is any device now known to those having ordinary skill in the art or developed in the future that is capable of presenting content to a viewer or other type of content consumer. Non-limiting examples of content presentation devices include televisions, smart televisions, laptops, personal digital assistants (PDAs), table computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top-boxes, satellite receivers, video-on-demand (VOD) receivers, content receivers (e.g., Apple TV® manufactured by Apple Inc. of Cupertino, California, United States; Roku® manufactured by Roku, Inc. of Saratoga, California, United States), digital video recorders (DVRs), personal video recorders (PVRs), hard drives, flash drives, storage servers, digital video disc (DVD) devices, Blu-Ray™ devices, or the like. In some embodiments, the CPE 125a-n may include devices and/or equipment configured to transmit content to a content presentation device, such as a switch, a hub, a router, a gateway (for example, a residential gateway, an Internet gateway, a virtual gateway), a network adapter, a subscriber unit, or the like.

In some embodiments, the CPEs 125a-n may include and/or access a local storage device or "cache." In some embodiments, the cache may be configured to store content to be presented through the CPE 125a-n or a content presentation device associated with the CPE. In some embodiments, the content may be stored or "cached" in the local cache prior to consumption of the content. The cache device may include any type of storage device now known in the art or developed in the future, including, without limitation, a non-transitory storage medium, RAM, ROM, flash, hard disk drive (HDD), solid-state-disk (SSD) drive, SCSI, remote storage, or the like.

In some embodiments, at least a portion of the content provided through the CDN 120 may be addressable content. In general, addressable content includes content that may be addressed to one or more targets (CPEs) based on various characteristics associated with the content, the CPE (and/or content presentation device if the CPE is not a content presentation device), the consumer associated with the CPE, the service provider, or any other characteristic capable of being used to target the addressable content. For example, certain addressable content may be targeted to CPEs based on demographic information of consumers associated with the CPE, such as age, gender, marital status, income level, education, occupation, historical data (e.g., purchases, content consumption, etc.), or the like. In another example, the addressable content may be targeted to CPEs associated with a particular service provider. In a further example, the addressable content may be targeted to CPEs having certain characteristics, such as certain resources or hardware capable of efficiently downloading and processing the addressable content.

The system may include and/or access various databases 135a-n, including external and/or third-party databases, storing content targeting information for targeting, building, and/or selecting the addressable content. For example, the databases 135a-n may include demographic information, content segments (for building content based on the content targeting information), microtrend data, or any other information or processes that may be used to target addressable content.

The system 100 may include a content management computing device or server 115 configured to manage the delivery of content. In some embodiments, the content management server 115 may be configured as an "addressable" content server configured to manage addressable content. The addressable content server 115 may be configured to place addressable content on the CDN 120 for delivery to the CPEs 125a-n.

In a conventional system, when an addressable content opening occurs, the CPE 125a-n may submit a message to the content management server 115, and the content management server 115 may instruct the CPE 125a-n which content to play/access. The CPE 125a-n may then obtain the addressable content from the CDN 120. However, this conventional process is inefficient and often ineffective. For example, network 105 and/or CDN 120 bandwidth is often limited and, as such, it is often not possible to stream, on-demand and in substantially real-time, all addressable content simultaneously to all CPEs 125a-n. In another example, content delivered over a network, such as an Internet protocol (IP) network requires time to buffer, for instance, to deal with potential quality-of-service (QoS) issues. In conventional systems, such as linear programming systems, there is not sufficient notice of an addressable content opening (for instance, an addressable advertising break in which the break signal or "cue" is issued when the break actually occurs) to buffer or cache the addressable content.

However, in some embodiments, the CPEs 125a-n may be configured to obtain content, including addressable content, from a local cache. The system 100 may include a cache policy computing device or server 110 configured to, among other things, transmit cache messages to the CPEs 125a-n regarding which addressable content to cache. In some embodiments, the cache policy server 110 may determine which addressable content may be viewed by which CPEs from the content management server 115 and other information, such as when the advertisement may be consumed by the CPE 125a-n or associated content consumption device. In some embodiments, the cache policy server 110 may query the content management server 115 at predetermined times, such as at low-bandwidth periods (e.g., 2:00 a.m.) and/or based on a schedule. In such embodiments, the cache policy server 110 may determine the addressable content for the CPEs 125a-n for a certain duration, such as an 8-hour period, a 24-hour period, a week, or the like. In this manner, the CPEs 125a-n may cache all of the content over the specified period. In such embodiments, the caches of the CPEs 125a-n may be cleared at the end of each period, such as at the end of the day. In other embodiments, the cache policy server 110 may determine the addressable content for the CPEs 125a-n responsive to an addressable break (or a signal that an addressable break is coming up within a predetermined time period).

Figure 2:
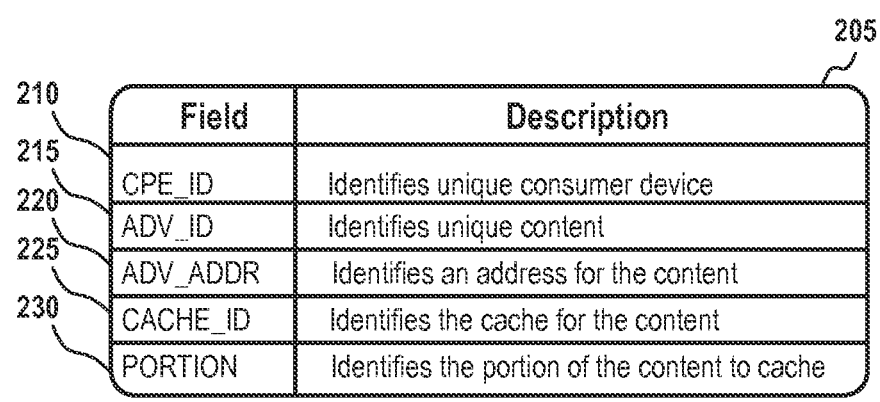
FIG. 2 depicts an illustrative cache message for addressable advertising content according to some embodiments.

The cache messages may include various types of information, such as address information, content information, server information, network information, cloud information, CDN information, or the like. FIG. 2 depicts an illustrative cache message for addressable advertising content according to some embodiments. As shown in FIG. 2, the cache message 205 may include various fields 210-230. A CPE_ID field 210 may be configured as a consumer device identifier and/or a CPE identifier, such as a unique address, including a MAC, IP address, serial number, or identifier provided by the system 100. In some embodiments, the CPE_ID field 210 may be used by the cache policy server 110 to address the cache message 205. An ADV_ID field 215 may be configured as a content identifier to allow the CPE 125a-n to identify the content. An ADV_ADDR field 220 may be configured as a content address identifier to allow the CPE 125a-n to locate the content identified by the ADV_ID field 215. A CACHE_ID field 220 may be configured to instruct the CPE 125a-n to cache the content in a particular cache location, such as RAM, storage disk (HDD or SDD), flash, or the like, and/or a combination thereof. A PORTION field 230 may identify the portion of the content to cache, such as the first 2 seconds, the first 10 seconds, or the entire content asset. The cache message 205 may include more or fewer fields than those depicted in FIG. 2. In some embodiments, the cache message 205 may have default values for each field that may be used if the value for a field is not specified. For example, the default value for the PORTION field 230 may be set to "full" (cache entire content asset). In some embodiments, the cache message 205 may include instructions (not shown) configured for the CPE 125a-e to present the content, such as during a specified time, day-part, program, or the like.

In some embodiments, a content message 205 may be configured to carry information for multiple content assets. For example, a content message 205 may have a plurality of ADV_ID fields 215 and ADV_ADDR fields 225 to specify multiple content assets. In a multi-content asset embodiment, the content message 205 may also include multiple CACHE_ID fields 220 and/or PORTION fields 230 corresponding to the multiple content assets to specify the cache location and portion of the multiple content assets. In some embodiments, multiple content assets may be handled through multiple strings or instructions in a field (for instance, a concatenated or delimited string) configured to specify multiple content assets, addresses, caches, portions, or the like for multiple content assets.

In some embodiments, the CPE 125a-n may cache the content asset specified in the content message. For example, a content message may be sent to a CPE 125a-n specifying that the CPE download 10 seconds of an addressable advertisement (or other content) at a particular address for storage in RAM of the CPE. If the CPE 125a-n detects an addressable break, the CPE will determine which addressable advertisement to play during the addressable break from the content management server 115. If the addressable advertisement scheduled to be played is in the cache of the CPE 125a-n, the CPE will initiate presentation (e.g., playout) of the addressable advertisement. The cache device of the CPE 125a-n may be configured to maintain the caching portion specified by the cache message (i.e., the PORTION field 230 of the cache message 205). For example, if the addressable advertisement was cached for 10 seconds, the CPE 125a-n will start to play the addressable advertisement from cache device while the cache device continues to cache the addressable advertisement so that the CPE maintains the 10 second cache, for example, from a currently playing frame.

In some embodiments, the cache policy server 110, the content management server 115, and the CDN 120 may be configured as separate components of the system 100. In some embodiments, the cache policy server 110, the content management server 115, and the CDN 120 may be operated by different service providers. In some embodiments, two or more of the cache policy server 110, the content management server 115, and the CDN 120 may be configured as a single component. In some embodiments, two or more of the cache policy server 110, the content management server 115, and the CDN 120 may be configured as a distributed network of units.

Figure 3:
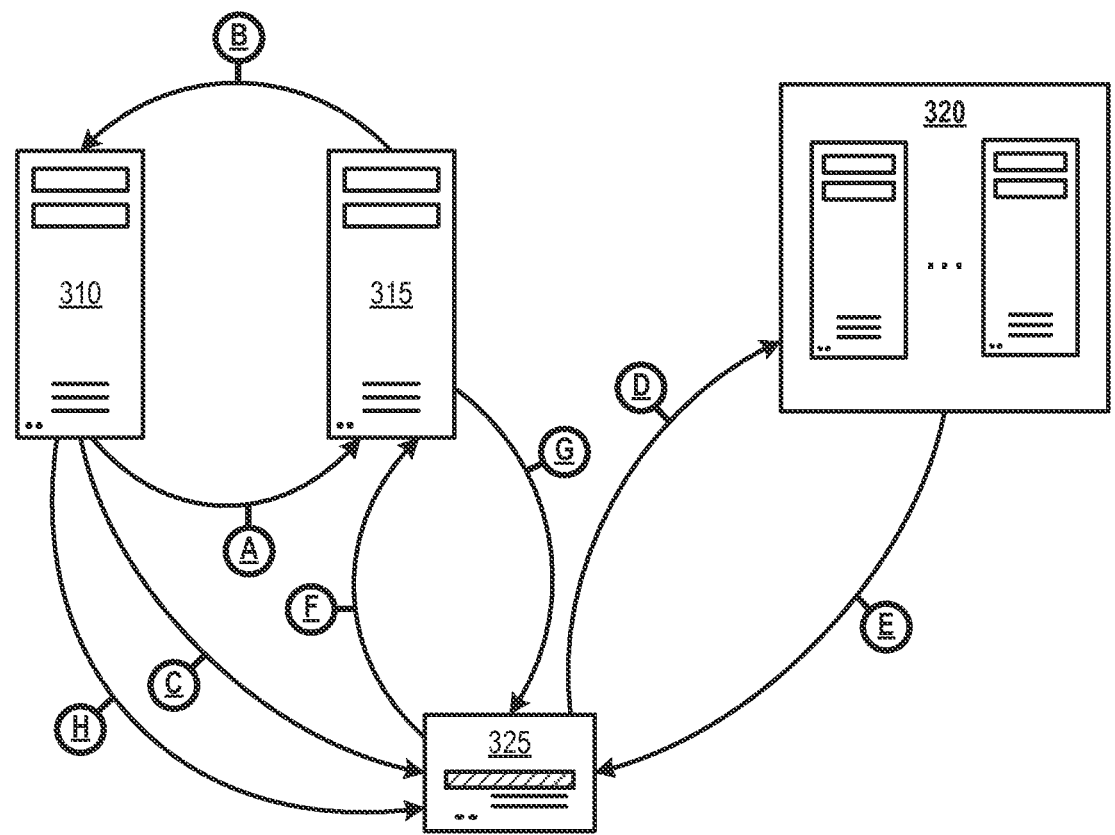
FIG. 3 depicts the flow of information and messages in a content delivery management system according to some embodiments.

FIG. 3 depicts the flow of information and messages in a content delivery management system according to some embodiments. As shown in FIG. 3, a cache policy server 310 may transmit a content request A to a content management server (or "addressable content server") 315 for a CPE 325. The a content request A may be transmitted based on various factors, such as a schedule, a time of day, expiration of a predetermined duration, availability of new content, or the like.

The addressable content server 315 may determine which addressable content may be played by the CPE 325. For example, the addressable content server 315 may use rules, processes, algorithms, or the like to determine which addressable content is appropriate for the CPE 325. The addressable content server 315 may determine the addressable content for the CPE 325 over a certain duration, such as an 8-hour duration, a 24-hour day, a week, or the like. The addressable content server 315 may determine other characteristics for the CPE 325 to play out the addressable content, such as during a specific day-part (e.g., morning, afternoon, evening, night, rush hour, prime time), during a specific program, or any other characteristic (e.g., weather, preceding content, CPE, playback device, or the like). The addressable content server 315 may transmit a content message B to the cache policy server 310 with consumer device content information including the content, content address, and playback instructions information.

The cache policy server 310 may transmit a cache message C to the CPE 325 configured based on the consumer device content information. Responsive to receiving the cache message C, the CPE 325 may transmit a content download request D to the CDN 320 to obtain the portion of the addressable content specified in the cache message C. The CDN may transmit the content E to the CPE 325 requested in the download request D. The download request D may include information sufficient for the CDN 320 to locate the addressable content and transmit it to the CPE as required, for example, by the cache message C. The CPE 325 may cache the content as instructed in the cache message C.

The CPE 325 may transmit an addressable content request F to the addressable content server 315 responsive to detecting an addressable break. The addressable content server 315 may transmit an addressable content message G to the CPE 325 that includes the addressable content to be played during the addressable break. The CPE 325 may determine whether the addressable content specified in the addressable content message G is cached at the CPE. If the addressable content is cached at the CPE 325, the CPE may begin to play out the addressable content from cache and, if the entirety of the addressable content is not cached, the CPE may transmit a content download request D to the CDN 320 to obtain the portion of the addressable content that is not stored in the cache. If the addressable content is not cached at the CPE 325, the CPE may transmit a content download request D to the CDN 320 to obtain the addressable content that is not stored in the cache. The CDN 320 may transmit the content E to the CPE 325 in response to receiving the content download request D.

In some embodiments, the cache policy server 310 may be configured to transmit a "clear cache" message H to the CPEs 325. The "clear cache" message H may be configured to instruct the CPEs 325 to delete at least a portion of the content cached in their cache devices. The cache policy server 310 may transmit the "clear cache" message H to the CPEs 325 based on various conditions, such as playback of a content, transmission of a cache message C, expiration of a predetermined time period, scheduled time period, instruction from the addressable content server 315, an indication that the cache of the CPE 325 is full or storage space is below a threshold, or the like.

In some embodiments, the cache policy server 310, the addressable content server 315, the CPEs 325, and the CDN 320 may exchange other messages and/or information in addition to the messages and information depicted in FIG. 3. For example, the cache policy server 310, the addressable content server 315, the CPEs 325, and the CDN 320 may transmit status messages, such as resource level, cache capacity, new content available, or the like. In some embodiments, the addressable content server 315 may transmit content targeting information (i.e., addressable content decision instructions) to the CPEs 325 to be cached. In such an embodiment, the addressable content server 315 may transmit a daily "content selections" message which could be stored in the cache. In this manner, for each upcoming addressable break, the CPEs 325 may receive a "decision identifier" in order to make addressable content selections instead of requesting from the addressable content server 315.

EXAMPLES

Example 1

A non-linear content delivery system is configured to use a 5-second pre-roll for each addressable advertising break in a unicast system with sufficient bandwidth between the CPEs and the cloud. The CPEs have limited RAM available for caching and do not have local disk cache. At pre-roll for each addressable break, the cache policy server may determine which addressable advertisements should be played at the CPEs from the addressable content server. The cache policy server may send a cache policy message to the CPEs configured to receive addressable content. Each CPE or segment of CPEs (e.g., demographic segment or other addressable content segment) may receive an individual cache policy message specific to their addressable content requirements. For example, the cache message may include (a) advertisements to be cached by the CPE, (b) which cache device to cache the advertisements (e.g., RAM), and (c) which portion of the advertisements to cache (e.g., 2 seconds). Responsive to receiving the cache message, the CPE may start to cache the first 2 seconds of the specified advertisements in RAM 5 seconds before the addressable break. The CPE may play the specified advertisements from RAM and the RAM cache may be cleared after the advertisement has been played out.

Example 2

A non-linear content delivery system includes a unicast system with sufficient bandwidth between the CPEs and the cloud. The CPEs have limited RAM available for caching and do not have local disk cache. At the predetermined time of 2:00 a.m., the cache policy server may determine which addressable advertisements should be played at the CPEs from the addressable content server over a specified period of 24-hours. The cache policy server may send a cache policy message to the CPEs specifying the addressable content over the 24-hour period. Each CPE or segment of CPEs may receive an individual cache policy message specific to their addressable content requirements. The cache message may include (a) advertisements to be cached by the CPE, (b) which cache device to cache the advertisements (e.g., RAM), and (c) which portion of the advertisements to cache (e.g., 2 seconds). Responsive to receiving the cache message, the CPE may start to cache the first 2 seconds of the specified advertisements for the specified period in RAM. The CPE may play the specified advertisements from RAM and the RAM cache may be cleared after the 24-hour period.

Example 3

A non-linear content delivery system includes a unicast system with limited bandwidth between the CPEs and the cloud. The CPEs have access to a local disk cache. At the predetermined time of 2:00 a.m., the cache policy server may determine which addressable advertisements should be played at the CPEs from the addressable content server over a specified period of 24-hours. The cache policy server may send a cache policy message to the CPEs specifying the addressable content over the 24-hour period. Each CPE or segment of CPEs may receive an individual cache policy message specific to their addressable content requirements. The cache message may include (a) advertisements to be cached by the CPE, (b) which cache device to cache the advertisements (e.g., disk), and (c) which portion of the advertisements to cache (e.g., "full"). Responsive to receiving the cache message, the CPE may start to cache the full advertisements on disk. The CPE may play the specified advertisements from disk and the disk cache may be cleared after the 24-hour period.

Figure 4:
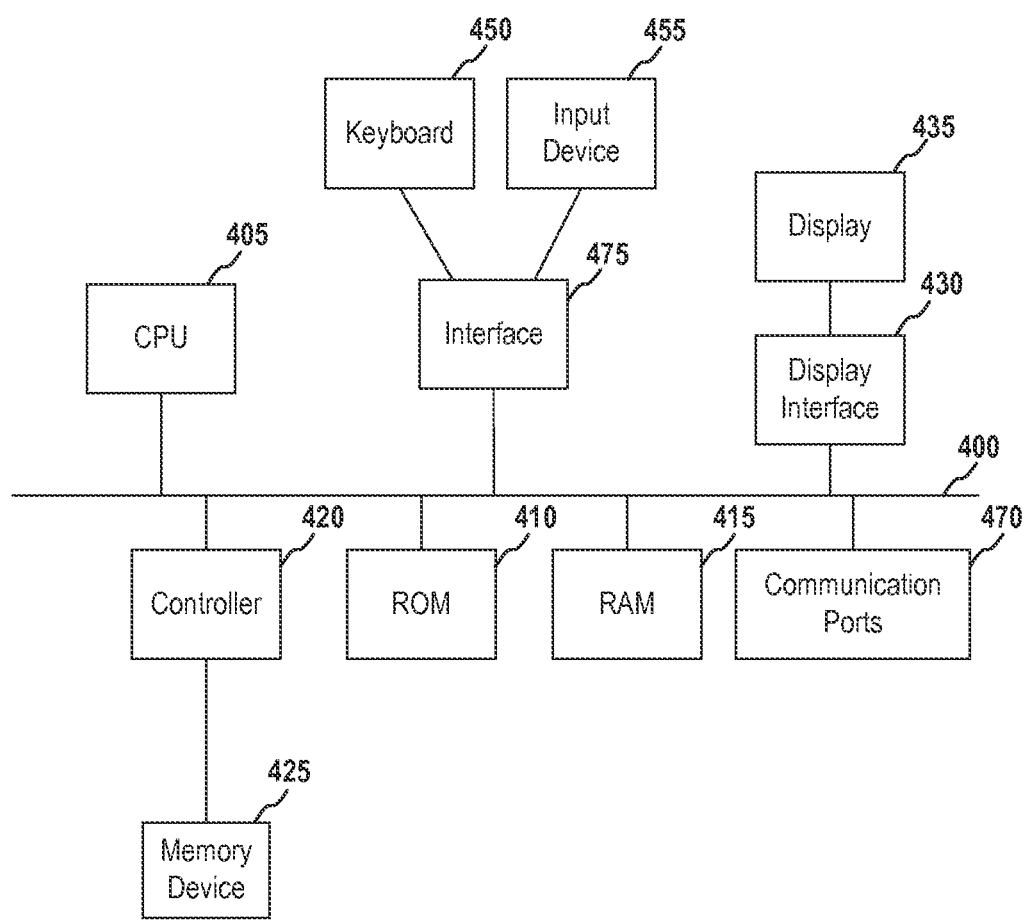
FIG. 4 illustrates various embodiments of a computing device for implementing the various methods and processes described herein.

FIG. 4 depicts a block diagram of exemplary internal hardware that may be used to contain or implement the various computer processes and systems as discussed above. A bus 400 serves as the main information highway interconnecting the other illustrated components of the hardware. CPU 405 is the central processing unit of the system, performing calculations and logic operations required to execute a program. CPU 405 is an exemplary processing device, computing device or processor as such terms are used within this disclosure. Read only memory (ROM) 430 and random access memory (RAM) 435 constitute exemplary memory devices.

A controller 420 interfaces with one or more optional memory devices 425 via the system bus 400. These memory devices 425 may include, for example, an external or internal DVD drive, a CD ROM drive, a hard drive, flash memory, a USB drive or the like. As indicated previously, these various drives and controllers are optional devices. Additionally, the memory devices 425 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determination, configuration, transmission, decoding, or the like of the presentation settings as described above may be stored in the ROM 410 and/or the RAM 415. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 430 can permit information from the bus 400 to be displayed on the display 435 in audio, visual, graphic or alphanumeric format. The information may include information related to a current job ticket and associated tasks. Communication with external devices may occur using various communication ports 470. An exemplary communication port 470 may be attached to a communications network, such as the Internet or a local area network.

The hardware may also include an interface 475 which allows for receipt of data from input devices such as a keyboard 450 or other input device 455 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the following claims.

What is claimed is:

1. A method comprising:
    sending, to a server, a request for information associated with content to be addressed to a computing device over a predetermined time period;
    receiving, from the server and based on the request, a message indicating one or more portions of addressable content to be cached over the predetermined time period at a cache device operably coupled to the computing device;
    generating, based on the received message and for the computing device, one or more instructions comprising one or more addressable content identifiers indicating to cache, during the predetermined time period, the one or more portions of addressable content; and
    sending, to the computing device, the one or more instructions to cause the computing device to:
        obtain the one or more portions of addressable content from a content delivery network (CDN),
        cache, during the predetermined time period, the one or more portions of addressable content in the cache device,
        playback the one or more portions of addressable content from the cache device, and
        clear the cache based on the predetermined time period expiring.

2. The method of claim 1, wherein the addressable content comprises advertising content.

3. The method of claim 1, wherein the computing device comprises at least one of: a consumer premises equipment, a switch, a router, a television, a digital video recorder, a mobile computing device, a content presentation device, a laptop, a smartphone, a tablet, or a set top box.

4. The method of claim 1, wherein the server comprises an addressable content server.

5. The method of claim 4, wherein the request is sent based on at least one of: a schedule, a time of day, an indication of availability of new content, or an expiration of a time period.

6. The method of claim 1, wherein the one or more portions of addressable content are selected based on at least one of:
- demographic information associated with one or more users of the computing device,
- a particular service provider associated with the computing device, or
- resources or hardware associated with the computing device.

7. A non-transitory computer-readable storage medium storing computer-readable instructions that, when executed by a processor, cause:
- sending, to a server, a request for information associated with content to be addressed to a computing device over a predetermined time period;
- receiving, from the server and based on the request, a message indicating one or more portions of addressable content to be cached over the predetermined time period at a cache device operably coupled to the computing device;
- generating, based on the received message and for the computing device, one or more instructions comprising one or more addressable content identifiers indicating to cache, during the predetermined time period, the one or more portions of addressable content; and
- sending, to the computing device, the one or more instructions to cause the computing device to:
  - obtain the one or more portions of addressable content from a content delivery network (CDN),
  - cache, during the predetermined time period, the one or more portions of addressable content in the cache device,
  - playback the one or more portions of addressable content from the cache device, and
  - clear the cache based on the predetermined time period expiring.

8. The non-transitory computer-readable storage medium of claim 7, wherein the server comprises an addressable content server.

9. The non-transitory computer-readable storage medium of claim 8, wherein the request is sent based on at least one of: a schedule, a time of day, an indication of availability of new content, or an expiration of a time period.

10. The non-transitory computer-readable storage medium of claim 7, wherein the addressable content comprises advertising content.

11. The non-transitory computer-readable storage medium of claim 7, wherein the one or more portions of addressable content are selected based on at least one of:
- demographic information associated with one or more users of the computing device,
- a particular service provider associated with the computing device, or
- resources or hardware associated with the computing device.

12. A device comprising:
one or more processors; and
memory storing instructions that, when executed by the one or more processors, cause the device to:
- send, to a server, a request for information associated with content to be addressed to a computing device over a predetermined time period;
- receive, from the server and based on the request, a message indicating one or more portions of addressable content to be cached over the predetermined time period at a cache device operably coupled to the computing device;
- generate, based on the received message and for the computing device, one or more instructions comprising one or more addressable content identifiers indicating to cache, during the predetermined time period, the one or more portions of addressable content; and
- send, to the computing device, the one or more instructions to cause the computing device to:
  - obtain the one or more portions of addressable content from a content delivery network (CDN),
  - cache, during the predetermined time period, the one or more portions of addressable content in the cache device,
  - playback the one or more portions of addressable content from the cache device, and
  - clear the cache based on the predetermined time period expiring.

13. The device of claim 12, wherein the addressable content comprises advertising content.

14. The device of claim 12, wherein the computing device comprises at least one of: a consumer premises equipment, a switch, a router, a television, a digital video recorder, a mobile computing device, a content presentation device, a laptop, a smartphone, a tablet, or a set top box.

15. The device of claim 12, wherein the server comprises an addressable content server.

16. The device of claim 15, wherein the request is sent based on at least one of: a schedule, a time of day, an indication of availability of new content, or an expiration of a time period.

17. The device of claim 12, wherein the one or more portions of addressable content are selected based on at least one of:
- demographic information associated with one or more users of the computing device,
- a particular service provider associated with the computing device, or
- resources or hardware associated with the computing device.

* * * * *